(12) United States Patent
Takeuchi (10) Patent No.: US 9,890,736 B2
(45) Date of Patent: Feb. 13, 2018

(54) INJECTION CONTROL DEVICE FOR INTERNAL COMBUSTION ENGINE OF CYLINDER-INJECTION TYPE

(71) Applicant: DENSO CORPORATION, Kariya, Aichi-pref. (JP)

(72) Inventor: Hatsumi Takeuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/301,497

(22) PCT Filed: Mar. 26, 2015

(86) PCT No.: PCT/JP2015/001756
§ 371 (c)(1),
(2) Date: Oct. 3, 2016

(87) PCT Pub. No.: WO2015/151482
PCT Pub. Date: Oct. 8, 2015

(65) Prior Publication Data
US 2017/0122245 A1 May 4, 2017

(30) Foreign Application Priority Data
Apr. 3, 2014 (JP) .................................. 2014-77198

(51) Int. Cl.
*F02D 41/40* (2006.01)
*F01N 3/20* (2006.01)
(Continued)

(52) U.S. Cl.
CPC ........... *F02D 41/40* (2013.01); *F01N 3/2006* (2013.01); *F02D 41/025* (2013.01);
(Continued)

(58) Field of Classification Search
CPC .. F02D 41/38; F02D 41/3809; F02D 41/3818; F02D 41/3827; F02D 2041/2027;
(Continued)

(56) References Cited

U.S. PATENT DOCUMENTS 6,892,708 B2 * 5/2005 Nasu ...................... F02D 41/20
123/490
8,280,613 B2 * 10/2012 Toyohara ................ F02D 41/20
123/490
(Continued)

FOREIGN PATENT DOCUMENTS

JP 2009-243269 10/2009
JP 2012-102657 5/2012
(Continued)

*Primary Examiner* — Sizo Vilakazi
*Assistant Examiner* — Kevin R Steckbauer
(74) *Attorney, Agent, or Firm* — Nixon & Vanderhye P.C.

(57) ABSTRACT

A injection control device for an internal combustion engine includes a fuel injection valve directly injecting a fuel into a cylinder of the internal combustion engine, and a drive current setting unit setting a drive current of the fuel injection valve according to a fuel pressure that is a pressure of the fuel supplied to the fuel injection valve, using a drive current profile specifying a relation between the fuel pressure and the drive current. When a compression stroke injection injecting the fuel in a compression stroke or an expansion stroke injection injecting the fuel in an expansion stroke is executed, the drive current setting unit sets the drive current using a predetermined profile having no hysteresis in change characteristics of the drive current with respect to the fuel pressure in a fuel pressure region of the compression stroke injection or the expansion stroke injection, as the drive current profile.

5 Claims, 7 Drawing Sheets (51) Int. Cl.
  *F02D 41/02* (2006.01)
  *F02D 41/06* (2006.01)
  *F02M 47/00* (2006.01)
  *F02M 51/06* (2006.01)

(52) U.S. Cl.
  CPC .......... *F02D 41/068* (2013.01); *F02M 47/00* (2013.01); *F02M 51/06* (2013.01); *F02M 51/061* (2013.01); *F02D 2200/0602* (2013.01)

(58) Field of Classification Search
  CPC .......... F02D 2041/2048; F02D 19/027; F02D 2250/04
  See application file for complete search history.

(56) References Cited

U.S. PATENT DOCUMENTS

| | | | |
|---|---|---|---|
| 9,593,657 B2* | 3/2017 | Kusakabe | ............... F02D 41/20 |
| 2004/0040545 A1* | 3/2004 | Nasu | ............... F02D 41/20 |
| | | | 123/490 |
| 2008/0289608 A1 | 11/2008 | Matsuura et al. | |
| 2011/0100333 A1* | 5/2011 | Toyohara | ............... F02D 41/20 |
| | | | 123/490 |
| 2013/0139791 A1* | 6/2013 | Kusakabe | ............... F02D 41/20 |
| | | | 123/478 |
| 2016/0047330 A1* | 2/2016 | Mukaihara | ............... F02D 41/20 |
| | | | 123/472 |

FOREIGN PATENT DOCUMENTS

| | | |
|---|---|---|
| JP | 2013-124577 | 6/2013 |
| JP | 2014-1694 | 1/2014 |

* cited by examiner

INJECTION CONTROL DEVICE FOR INTERNAL COMBUSTION ENGINE OF CYLINDER-INJECTION TYPE

CROSS REFERENCE TO RELATED APPLICATION

This application is the U.S. national phase of International Application No. PCT/JP2015/001756 filed on Mar. 26, 2015 which designated the U.S. and claims priority to Japanese Patent Application No. 2014-77198 filed on Apr. 3, 2014, the entire contents of each of which are incorporated herein by reference.

TECHNICAL FIELD

The present disclosure relates to an injection control device for an internal combustion engine of a cylinder-injection type, which sets a drive current of a fuel injection valve according to a pressure of fuel supplied to the fuel injection valve.

BACKGROUND ART

In an injection control system of internal combustion engine, for example, as described in Patent Literature 1 (JP2012-102657A), by increasing a target drive current of the fuel injection valve as a target fuel pressure becomes higher, even when the fuel pressure is high, the fuel injection valve can be reliably opened.

Figure 5:
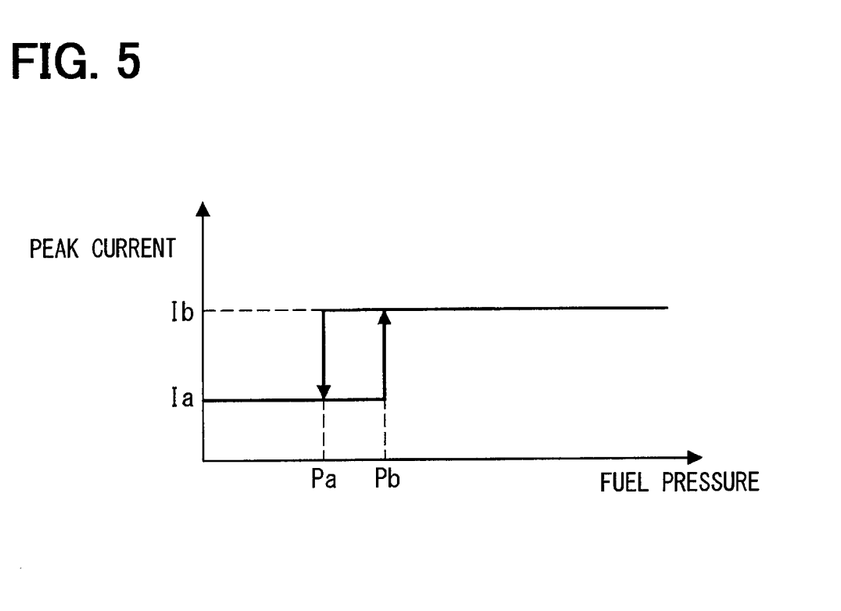
FIG. 5 is a view illustrating a first drive current profile.

The inventor has examined a system used in an internal combustion engine of a cylinder-injection type. As illustrated in FIG. 5, in order to prevent a drive current of the fuel injection valve from frequently changing with a change of a fuel pressure in setting of the drive current according to the fuel pressure, the system uses a drive current profile having a hysteresis in change characteristics of the drive current with respect to the fuel pressure. In this case, the drive current is, for example, a peak current.

However, when the drive current is set using the drive current profile having a hysteresis, the drive current may vary even at the same fuel pressure, causing a variation in an injection amount. Some internal combustion engines of a cylinder-injection type execute intake stroke injection that injects fuel in an intake stroke and a compression stroke injection that injects fuel in a compression stroke during execution of catalyst early-stage warming control that early warms up a catalyst purifying an exhaust gas, and a particulate matter (PM) emission greatly varies according to the injection amount of the compression stroke injection. For this reason, when the injection amount of the compression stroke injection largely varies due to the hysteresis in the drive current profile, the PM emission may exceed an allowable upper limit, or the injection amount is put into an accidental fire region. Such phenomenon can occur in an expansion stroke injection that injects fuel in an expansion stroke.

PRIOR ART LITERATURES

Patent Literature

Patent Literature 1: JP2012-102657A

SUMMARY OF INVENTION

An object of the present disclosure is to provide an injection control device for an internal combustion engine of a cylinder-injection type which is capable of suppressing a variation in an injection amount of a compression stroke injection or an expansion stroke injection, and suppressing an increase in a PM emission and accidental fire due to the variation in the injection amount.

According to an aspect of the present disclosure, the injection control device for the internal combustion engine of a cylinder-injection type includes a fuel injection valve directly injecting a fuel into a cylinder of the internal combustion engine, and a drive current setting unit setting a drive current of the fuel injection valve according to a fuel pressure, using a drive current profile specifying a relation between the fuel pressure and the drive current. In this case, the fuel pressure is a pressure of the fuel supplied to the fuel injection valve. When a compression stroke injection that injects the fuel in a compression stroke or an expansion stroke injection that injects the fuel in an expansion stroke is executed in the internal combustion engine, the drive current setting unit sets the drive current using a predetermined profile having no hysteresis in change characteristics of the drive current with respect to the fuel pressure in a fuel pressure region of the compression stroke injection or the expansion stroke injection, as the drive current profile.

Thus, in the case where the compression stroke injection or the expansion stroke injection is executed, the situation where the peak current of the fuel injection valve varies at the same fuel pressure can be avoided, preventing a variation in the injection amount due to the hysteresis in the drive current profile. As a result, the variation in the injection amount of the compression stroke injection or the expansion stroke injection can be suppressed to suppress an increase in PM emission and accidental fire due to the variation in the injection amount.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

An embodiment embodying a mode for carrying out the present disclosure will be described below.

Figure 1:
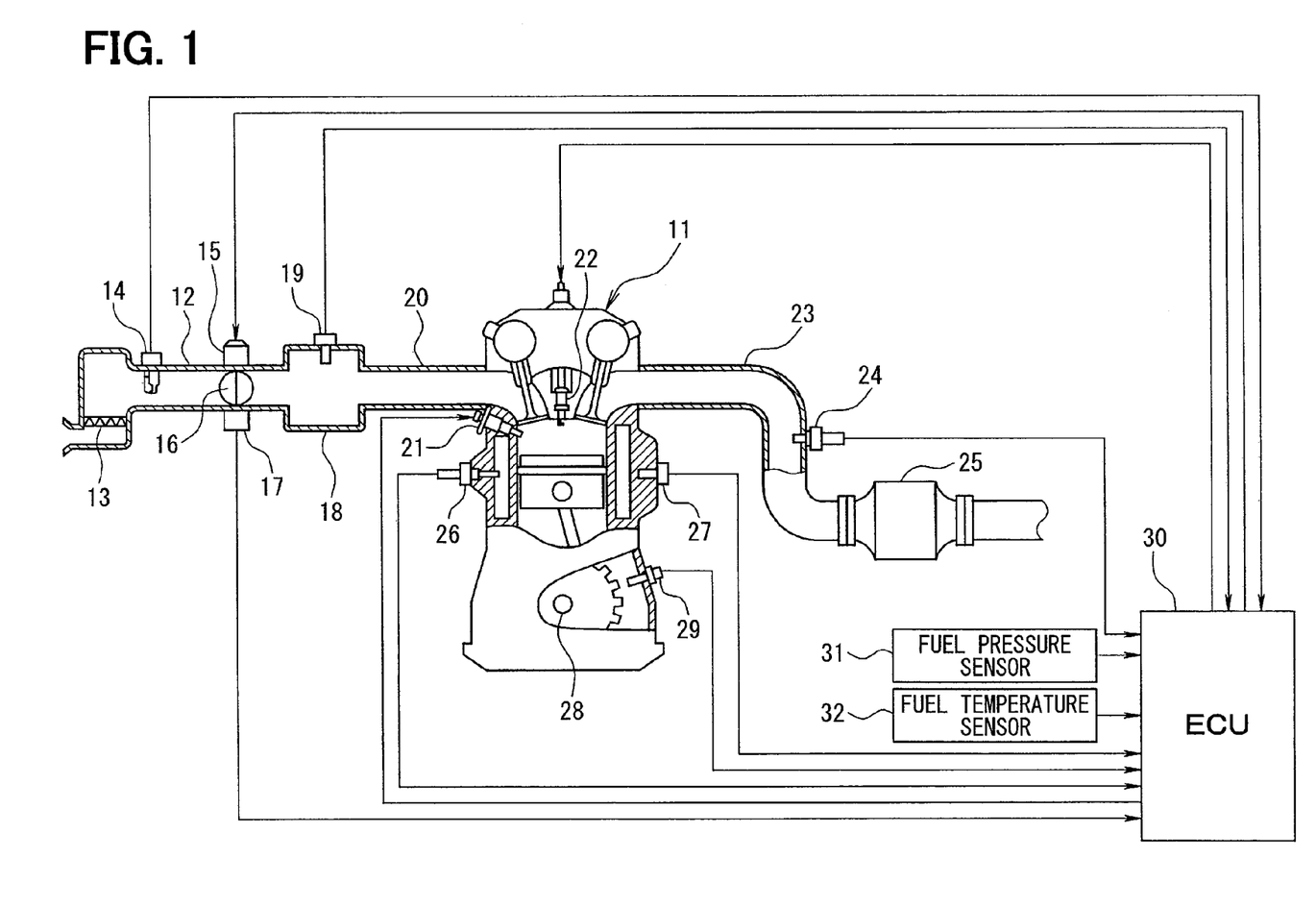
FIG. 1 is a schematic view illustrating an engine control system according to an embodiment of the present disclosure.

First, configuration of an entire engine control system will be described with reference to FIG. 1.

An air cleaner 13 is provided at the most upstream site of an intake pipe 12 of an engine 11 that is an internal combustion engine of a cylinder-injection type, and an air flow meter 14 that detects an amount of intake air is provided downstream of the air cleaner 13. A throttle valve 16, opening of which is adjusted by a motor 15, and a throttle opening sensor 17 that detects the opening of the throttle valve 16 are provided downstream of the air flow meter 14. In the present embodiment, the opening of the throttle valve 16 is referred to as throttle opening.

A surge tank 18 is provided downstream of the throttle valve 16, and the surge tank 18 is equipped with an intake pipe pressure sensor 19 that detects a pressure of the intake pipe. The surge tank 18 is equipped with an intake manifold 20 that introduces air into each cylinder of the engine 11, and a fuel injection valve 21 that directly injects fuel into the cylinder is attached to each cylinder of the engine 11. A spark plug 22 is attached to a cylinder head of each cylinder of the engine 11, and spark discharge of the spark plug 22 for each cylinder ignites an air-fuel mixture in each cylinder.

An exhaust pipe 23 of the engine 11 is provided with an exhaust gas sensor 24 that detects an air-fuel ratio or rich/lean of exhaust gas. In the present embodiment, the exhaust gas sensor 24 is an air-fuel ratio sensor or an oxygen sensor. A catalyst 25 such as a three-way catalyst purifying an exhaust gas is provided downstream of the exhaust gas sensor 24.

A cooling water temperature sensor 26 that detects temperature of cooling water and a knock sensor 27 that detects knocking are attached to a cylinder block of the engine 11. A crank angle sensor 29 that outputs a pulse signal each time a crank shaft 28 rotates at a predetermined crank angle is attached to the side of the outer circumference of the crank shaft 28, and the crank angle and engine rotational speed are detected based on the output signal of the crank angle sensor 29.

Further, a fuel supply system (not illustrated) that supplies fuel to the fuel injection valve 21 is provided with a fuel pressure sensor 31 that detects fuel pressure and a fuel temperature sensor 32 that detects fuel temperature.

Outputs of the above-mentioned various sensors are inputted to an electronic control unit (ECU) 30. The ECU 30 is mainly configured of a microcomputer, and executes various engine control programs stored in a memory, which is a built-in ROM, thereby controlling a fuel injection amount, an ignition timing, a throttle opening, an amount of intake air, and so on.

The ECU 30 executes a catalyst early-stage warming control routine not illustrated, and performs catalyst early-stage warming control when a predetermined condition for executing catalyst early-stage warming control is satisfied after activation of the engine 11. In this case, for example, the execution condition is satisfied after cold activation. In catalyst early-stage warming control, for example, ignition retard control to retard the ignition timing is performed to rise exhaust temperature, promoting warm-up of the catalyst 25. In the present embodiment, the fuel injection valve 21 and the ECU 30 function as the injection control device of the engine 11.

The ECU 30 also executes an injection control routine illustrated in FIG. 9 to control injection of the fuel injection valve 21 as described below.

First, the ECU 30 calculates a basic injection amount as well as various injection amount correction values, based on an engine operating state and so on, and corrects the basic injection amount using the injection amount correction values to find a required injection amount. In this case, the various injection amount correction values include, for example, activation increase correction value, warm-up increase correction value, and air-fuel ratio feedback correction value.

After that, the ECU 30 determines whether a division injection execution condition is satisfied based on the engine operating state, the required injection amount, and so on. When the division injection execution condition is not satisfied, the ECU 30 performs normal injection to inject a required injection amount of fuel from the fuel injection valve 21 into the cylinder at one time. In normal injection, for example, either intake stroke normal injection that injects fuel in an intake stroke, or a compression stroke normal injection to inject fuel in the compression stroke is performed.

On the contrary, when the division injection execution condition is satisfied, the ECU 30 performs division injection to divide the required injection amount of fuel and inject the divided fuel from the fuel injection valve 21 into the cylinder plural times. In division injection, for example, any of an intake stroke division injection to inject fuel in the intake stroke twice or more, an intake-compression stroke division injection to inject fuel in each of the intake stroke and the compression stroke once or more, a compression stroke division injection to inject fuel in the compression stroke twice or more, and an intake-expansion stroke division injection to inject fuel in each of the intake stroke and an expansion stroke once or more is performed.

The fuel injection valve 21 is an electromagnetically driven fuel injection valve that drives a valve body (not illustrated) in the valve opening direction by an electromagnetic force generated when a drive coil (not illustrated) is energized. When the fuel injection valve 21 injects fuel, the ECU 30 controls the drive current that is a current passing to the drive coil of the fuel injection valve 21, in a following manner.

Figure 2:
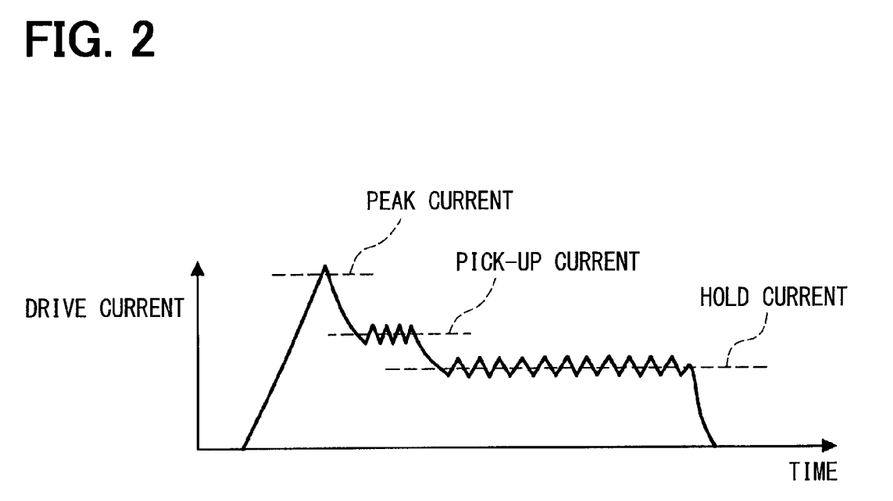
FIG. 2 is a time chart illustrating a drive current of a fuel injection valve.

As illustrated in FIG. 2, first, the ECU 30 turns on an injection pulse of the fuel injection valve 21 (that is, turns on energization of the drive coil) to rise the drive current up to a peak current and to open the valve body of the fuel injection valve 21. Then, the ECU 30 maintains the drive current to be a pick-up current that is lower than the peak current, and moves the valve body of the fuel injection valve 21 to a valve opening position. After that, the ECU 30 maintains the drive current to be a hold current that is lower than the pick-up current, and keeps the valve body of the fuel injection valve 21 at the valve opening position. Then, the ECU 30 turns off the injection pulse of the fuel injection valve 21 (that is, turns off energization of the drive coil) to close the valve body of the fuel injection valve 21.

Figure 10:
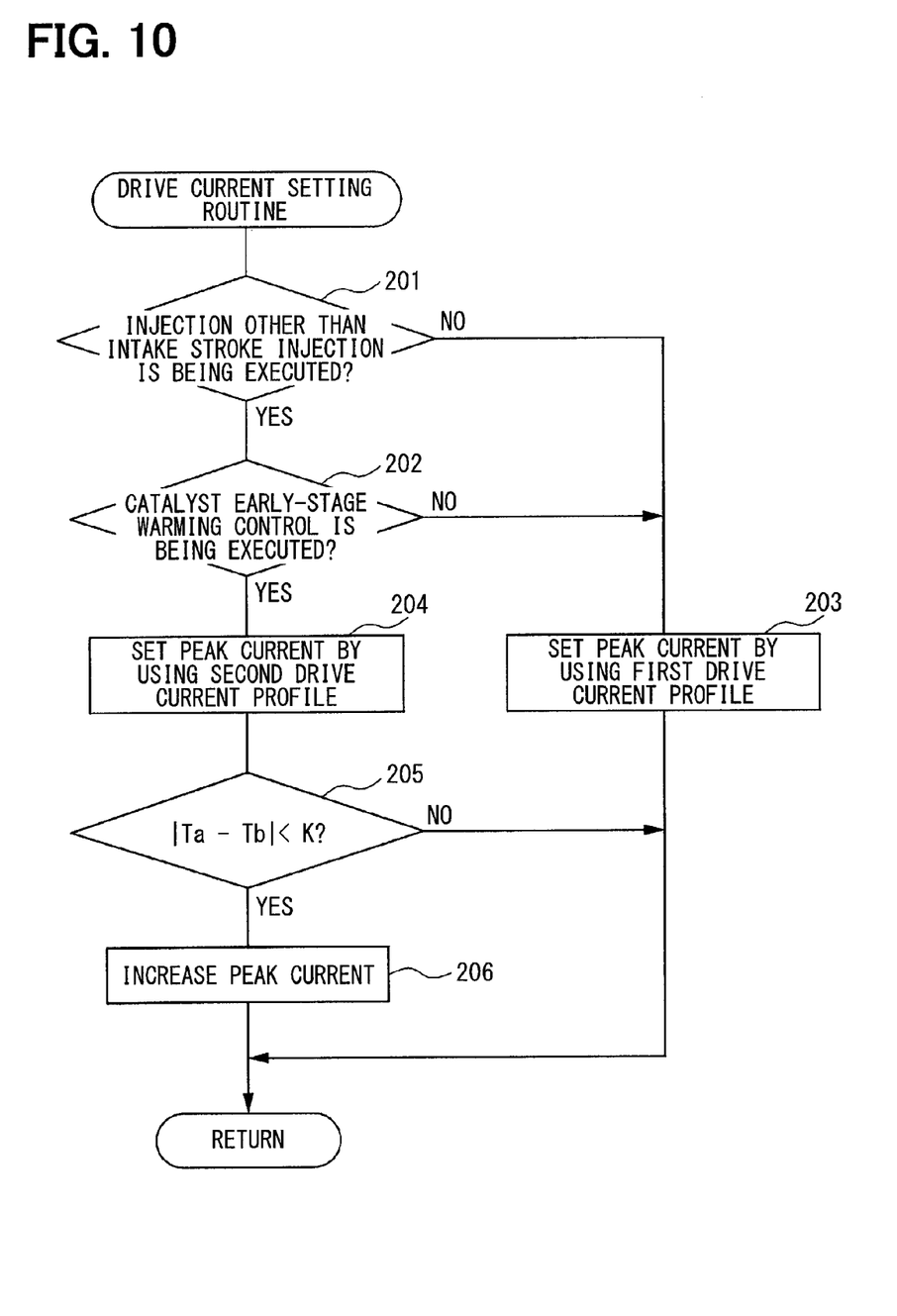
FIG. 10 is a flow chart illustrating a drive current setting routine.

At this time, the ECU 30 executes a drive current setting routine illustrated in FIG. 10 to set the drive current according to the fuel pressure by using a drive current profile specifying a relation between the pressure of fuel supplied to the fuel injection valve 21 and the drive current of the fuel injection valve 21. In the present embodiment, the drive current is, for example, a peak current. The peak current is a peak value of the drive current.

For example, as illustrated in FIG. 5, when only intake stroke injection that injects fuel in the intake stroke is performed, the ECU 30 sets the peak current corresponding to the fuel pressure using a first drive current profile. The first drive current profile is a drive current profile having a hysteresis in change characteristics of the peak current with respect to the fuel pressure. This prevents the peak current from frequently changing with a change of the fuel pressure.

Figure 3:
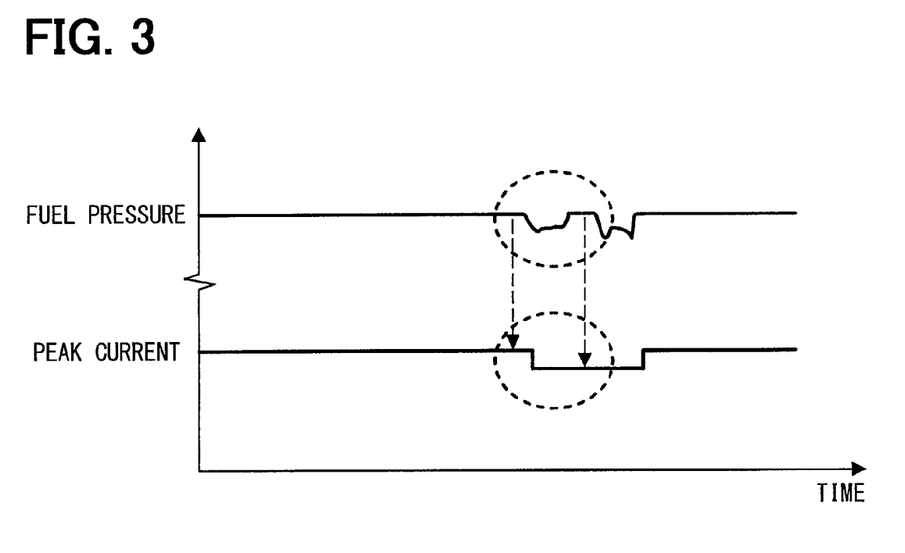
FIG. 3 is a time chart illustrating a fuel pressure and a peak current in the case where the peak current is set using a drive current profile having a hysteresis.
Figure 4:
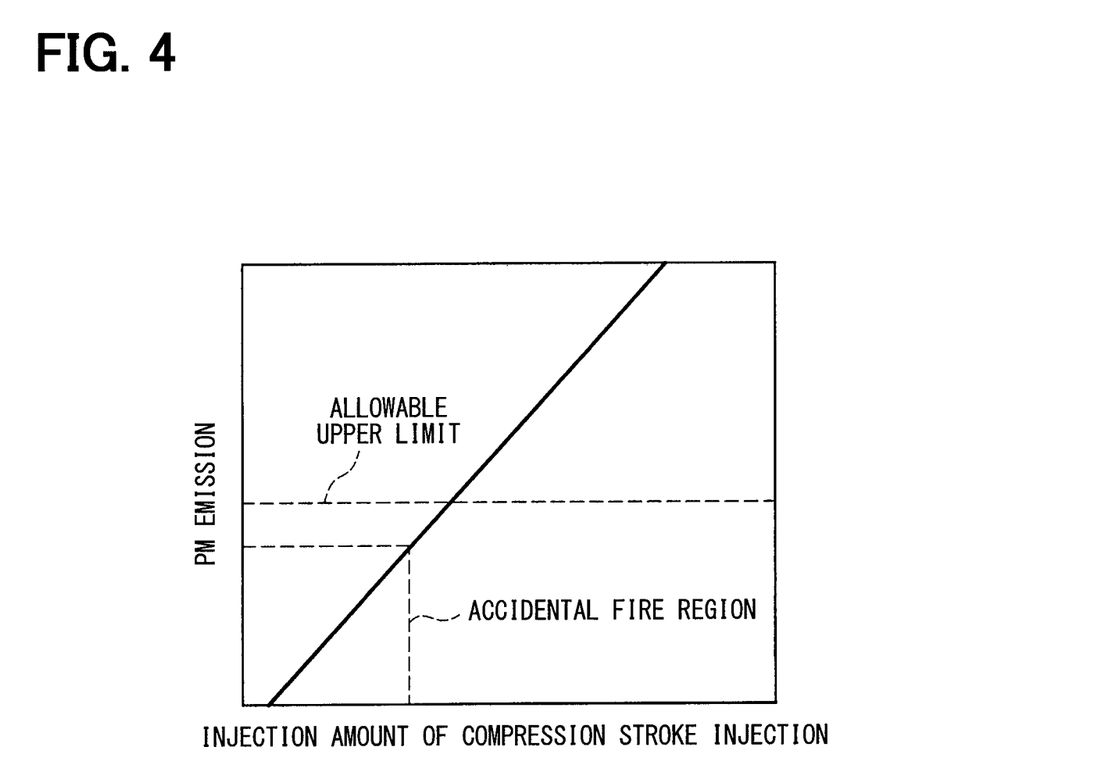
FIG. 4 is a view illustrating a relation between an injection amount of a compression stroke injection and a PM emission.

However, as illustrated in FIG. 3, in the case where the peak current is set using the drive current profile having the hysteresis, the peak current of the fuel injection valve 21 may vary even at the same fuel pressure, causing a variation in the injection amount. During execution of the catalyst early-stage warming control, the engine 11 executes intake stroke injection that injects fuel in the intake stroke and the compression stroke injection that injects fuel in the compression stroke. As illustrated in FIG. 4, a particulate matter (PM) emission largely varies according to the injection amount of the compression stroke injection. For this reason, when the injection amount of the compression stroke injection largely varies due to the hysteresis in the drive current profile, the PM emission may exceed an allowable upper limit, or the injection amount is put into an accidental fire region. Such phenomenon can occur in the expansion stroke injection that injects fuel in the expansion stroke.

Figure 6:
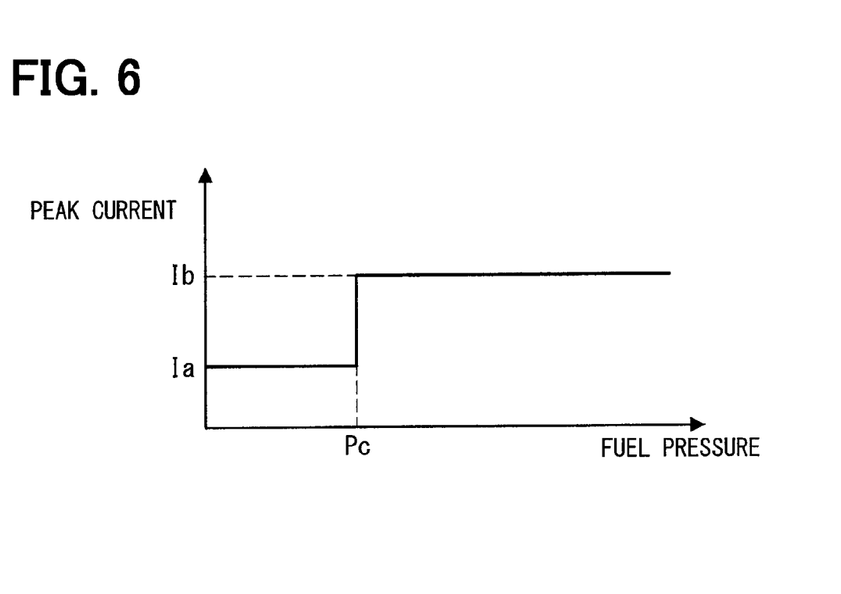
FIG. 6 is a view illustrating an example of a second drive current profile.
Figure 7:
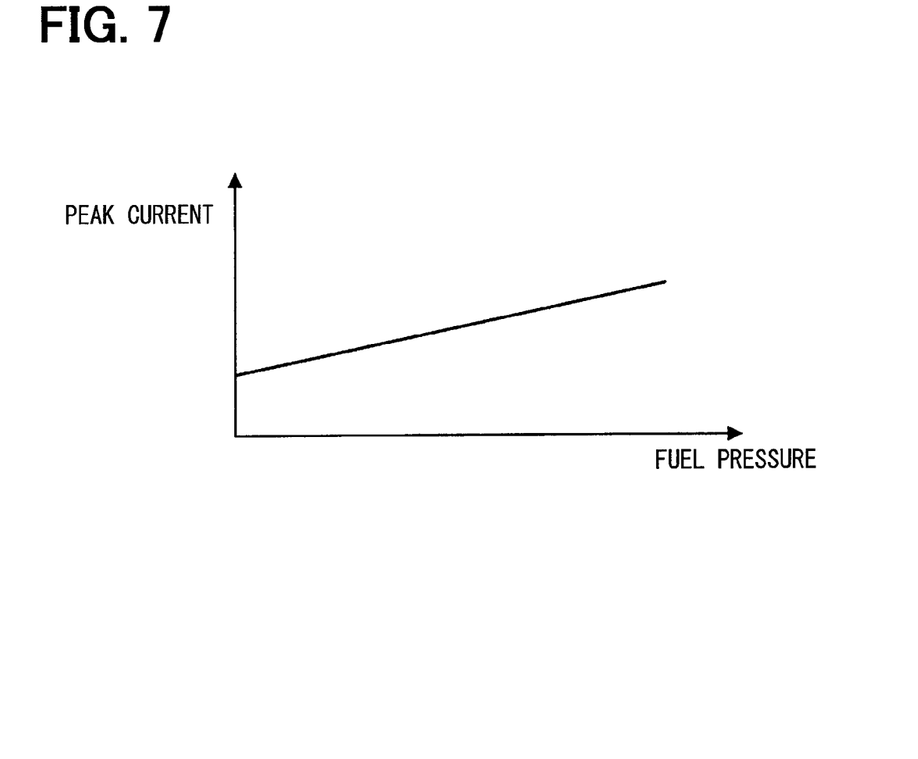
FIG. 7 is a view illustrating another example of the second drive current profile.
Figure 8:
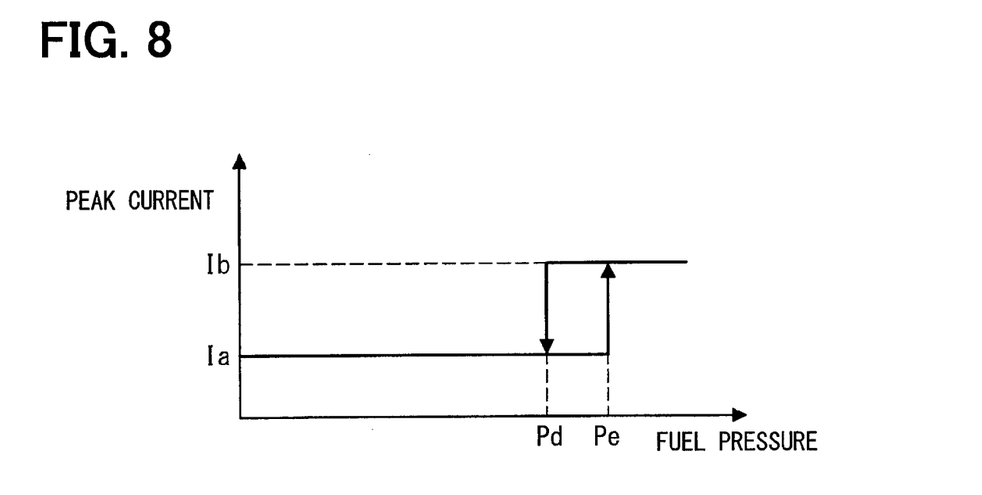
FIG. 8 is a view illustrating still another example of the second drive current profile.

In the present embodiment, as illustrated in FIGS. 6 to 8, when the compression stroke injection or the expansion stroke injection is executed during an execution of a catalyst early-stage warming control, the ECU 30 sets the peak current corresponding to the fuel pressure using a second drive current profile. The second drive current profile is a drive current profile having no hysteresis in change characteristics of the peak current with respect to the fuel pressure in a fuel pressure region of the compression stroke injection or the expansion stroke injection. Thus, in the case where the compression stroke injection or the expansion stroke injection is executed, the situation where the peak current of the fuel injection valve 21 varies at the same fuel pressure can be avoided, preventing a variation in the injection amount due to the hysteresis in the drive current profile. In the present embodiment, the second drive current profile is a predetermined profile.

When an injection time from turning-on to turning-off of energization of the fuel injection valve 21 gets closer to a peak current arrival time from turning-on of energization of the fuel injection valve 21 to arrival of the drive current at the peak current, a timing when energization is turned off gets closer to a timing when the drive current arrives at the peak current. In such a case, due to a variation in the peak current, energization may be turned off before the drive current arrives at the peak current (that is, during increase in the drive current), or after the drive current arrives at the peak current (that is, during decrease in the drive current), varying the injection amount.

In the present embodiment, the ECU 30 changes the peak current according to the injection time of the compression stroke injection or the expansion stroke injection. Specifically, when a difference between the injection time and the peak current arrival time of the fuel injection valve 21 is small, it is determined that the timing when energization is turned off is close to a timing when the drive current arrives at the peak current, and the peak current is increased. Accordingly, irrespective of a variation in the peak current, energization is turned off at all times before the drive current arrives at the peak current, suppressing a variation in the injection amount due to the variation in the peak current.

Figure 9:
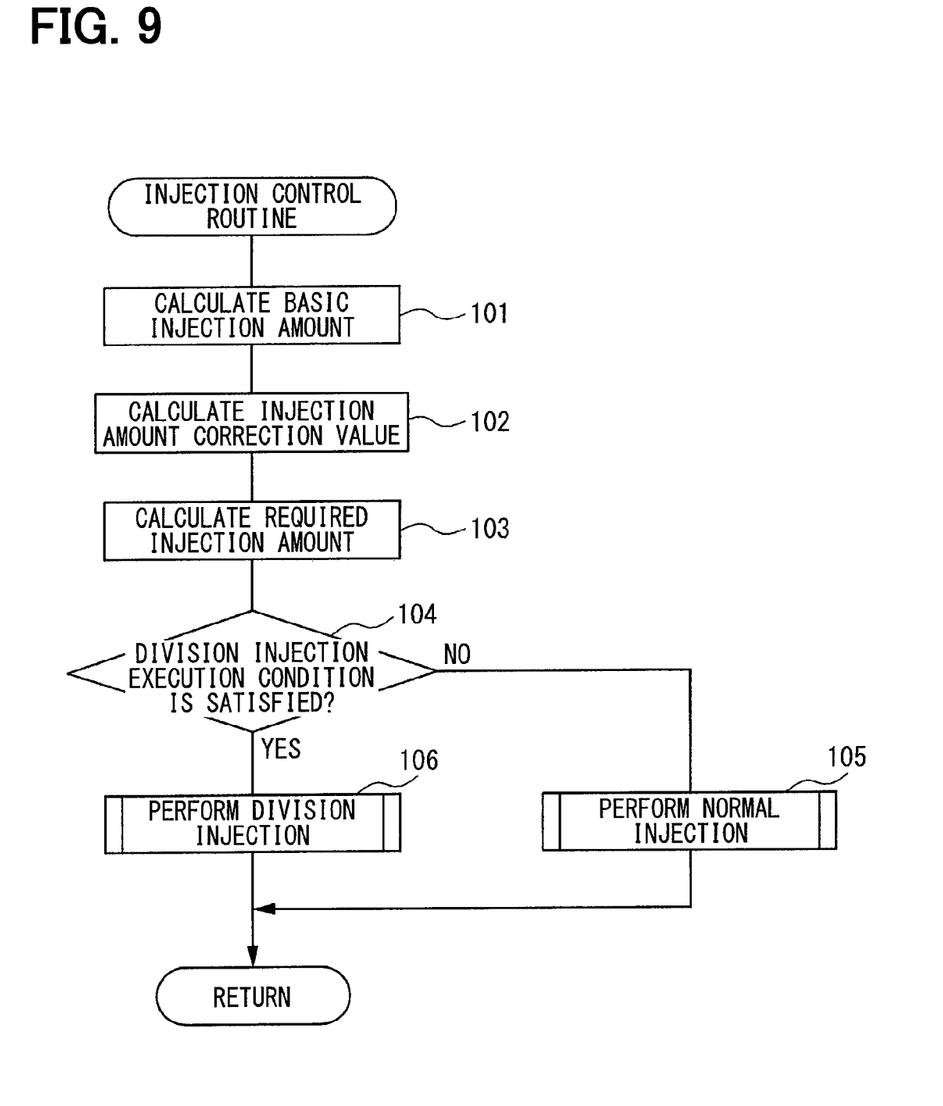
FIG. 9 is a flow chart illustrating an injection control routine.

Contents of the routines executed by the ECU 30 in the present embodiment, as illustrated in FIGS. 9 and 10, will be described below.

The injection control routine illustrated in FIG. 9 is repeated at a predetermined cycle during an ON period of the ECU 30. When the routine is started, first, in 101, the ECU 30 calculates the basic injection amount based on the engine operating state. In this case, examples of the engine operating state include engine rotational speed and load.

Then, the ECU 30 proceeds to 102, and calculates various injection amount correction values such as air-fuel ratio feedback correction value, activation increase correction value, and warm-up increase correction value. In this case, examples of the engine operating state include air-fuel ratio, cooling water temperature, engine rotational speed, and load.

After that, the ECU 30 proceeds to 103, adds or multiplies the injection amount correction value to or by the basic injection amount to correct the basic injection amount, finding the required injection amount.

Then, the ECU 30 proceeds to 104, and determines whether the division injection execution condition is satisfied based on the engine operating state, the required injection amount, or the like. In this case, examples of the engine operating state include engine rotational speed and load.

In 104, when determining that the division injection execution condition is not satisfied, the ECU 30 proceeds to 105, and performs normal injection to inject the required injection amount of fuel from the fuel injection valve 21 at one time. At this time, the ECU 30 sets the injection timing of normal injection based on the engine operating state (for example, engine rotational speed, load), the required injection amount, and the like. In normal injection, for example, either intake stroke normal injection that injects fuel in an intake stroke, or the compression stroke normal injection to inject fuel in the compression stroke is performed.

On the contrary, when determining that the division injection execution condition is satisfied in 104, the ECU 30 proceeds to 106, and performs division injection to divide the required injection amount of fuel and inject the divided fuel from the fuel injection valve 21 into the cylinder plural times. At this time, the ECU 30 sets various conditions for division injection based on the engine operating state (for example, engine rotational speed, load), the required injection amount, and the like. In division injection, for example, any of the intake stroke division injection to inject fuel in the intake stroke twice or more, the intake-compression stroke division injection to inject fuel in each of the intake stroke and the compression stroke once or more, the compression stroke division injection to inject fuel in the compression stroke twice or more, and the intake-expansion stroke division injection to inject fuel in each of the intake stroke and the expansion stroke once or more is performed. Examples of the various conditions for division injection include the number of times of injection, injection amount, and injection timing.

The drive current setting routine illustrated in FIG. 10 is repeated at a predetermined cycle during an ON period of the ECU 30, and functions as the drive current setting unit. When the routine is started, first, in 201, the ECU 30 determines whether injection other than intake stroke injection is being executed. That is, the ECU 30 determines whether the compression stroke injection or the expansion stroke injection is being executed.

When determining that injection other than intake stroke injection is not being performed in 201, for example, that intake stroke normal injection or intake stroke division injection is being performed, the ECU 30 proceeds to 203, and sets the peak current corresponding to the fuel pressure using the first drive current profile. The first drive current profile is a drive current profile having a hysteresis in change characteristics of the peak current with respect to the fuel pressure. The first drive current profile is previously created based on test data, design data or the like, and is stored in a ROM of the ECU 30.

Specifically, as illustrated in FIG. 5, according to the first drive current profile, in the case where the peak current is set to a first predetermined current value Ia, when the fuel pressure becomes higher than a second predetermined pressure value Pb, the peak current is switched from the first predetermined current value Ia to a second predetermined current value Ib in a stepped manner, and in the case where the peak current is set to the second predetermined current value Ib, when the fuel pressure becomes lower than a first predetermined pressure value Pa, the peak current is switched from the second predetermined current value Ib to the first predetermined current value Ia in a stepped manner.

On the contrary, when determining that injection other than intake stroke injection is being performed in 201, for example, when determining that any of the compression stroke normal injection, the intake-compression stroke division injection, the compression stroke division injection, and the intake-expansion stroke division injection is being performed, the ECU 30 proceeds to 202, and determines whether catalyst early-stage warming control is being executed.

When determining that catalyst early-stage warming control is not being executed in 202, the ECU 30 proceeds to 203, and sets the peak current corresponding to the fuel pressure by using the first drive current profile.

On the contrary, when determining that catalyst early-stage warming control is being executed in 202, that is, when determining that injection other than intake stroke injection is executed during an execution of a catalyst early-stage warming control, the ECU 30 proceeds to 204, and sets the peak current corresponding to the fuel pressure by using the second drive current profile. The second drive current profile is a drive current profile having no hysteresis in change characteristics of the peak current with respect to the fuel pressure in the fuel pressure region of the compression stroke injection or the expansion stroke injection. That is, the second drive current profile is a drive current profile in which the fuel pressure and the peak current have one-to-one correspondence in the fuel pressure region of the compression stroke injection or the expansion stroke injection. The second drive current profile is previously created based on test data, design data or the like, and is stored in the ROM of the ECU 30.

Specifically, as illustrated in FIG. 6, according to the second drive current profile, when the fuel pressure becomes higher than a third predetermined pressure value Pc, the peak current is switched from the first predetermined current value Ia to the second predetermined current value Ib in a stepped manner, and when the fuel pressure becomes the third predetermined pressure value Pc or less, the peak current is switched from the second predetermined current value Ib to the first predetermined current value Ia in a stepped manner. In this manner, the peak current can be changed according to the fuel pressure in a stepped manner while preventing the variation in the injection amount due to the hysteresis in the drive current profile.

Alternatively, as illustrated in FIG. 7, according to the second drive current profile, the peak current may be continuously increased as the fuel pressure increases. In this manner, the peak current can be continuously changed according to the fuel pressure while preventing the variation in the injection amount due to the hysteresis in the drive current profile.

Alternatively, as illustrated in FIG. 8, the second drive current profile may have a hysteresis in change characteristics of the peak current with respect to the fuel pressure in the fuel pressure region other than the fuel pressure region of the compression stroke injection or the expansion stroke injection. This also prevents the variation in the injection amount due to the hysteresis in the drive current profile.

Then, the ECU 30 proceeds to 205, and determines whether an absolute value |Ta−Tb| of a difference between an injection time Ta and a peak current arrival time Tb of the fuel injection valve 21 is smaller than a predetermined value K. In this case, the injection time Ta is a time from turning-on to turning-off of energization of the fuel injection valve 21, and the peak current arrival time Tb is a time from turning-on of energization of the fuel injection valve 21 to arrival of the drive current at the peak current.

When determining that the absolute value |Ta−Tb| of the difference between the injection time Ta and the peak current arrival time Tb of the fuel injection valve 21 is smaller than the predetermined value K in 205, the ECU 30 determines that the timing when energization is turned off is close to the timing when the drive current arrives at the peak current, and proceeds to 206 to increase the peak current by a predetermined value.

On the contrary, when determining that the absolute value |Ta−Tb| of the difference between the injection time Ta and the peak current arrival time Tb of the fuel injection valve 21 is the predetermined value K or more in 205, the ECU 30 finishes the routine without executing the processing in 206.

In the present embodiment, when the compression stroke injection or the expansion stroke injection is performed, the peak current corresponding to the fuel pressure is set using the second drive current profile having no hysteresis in the change characteristics of the peak current with respect to the fuel pressure in the fuel pressure region of the compression stroke injection or the expansion stroke injection. Thus, in the case where the compression stroke injection or the expansion stroke injection is executed, the situation where the peak current of the fuel injection valve 21 varies at the same fuel pressure can be avoided, preventing a variation in the injection amount due to the hysteresis in the drive current profile. As a result, the variation in the injection amount of the compression stroke injection or the expansion stroke injection can be suppressed to suppress an increase in PM emission and accidental fire due to the variation in the injection amount.

Moreover, in the present embodiment, in consideration that the effect of the compression stroke injection or the expansion stroke injection on PM emission and accidental fire is large during the execution of the catalyst early-stage warming control (that is, after cold activation), when the compression stroke injection or the expansion stroke injection is executed during the execution of the catalyst early-stage warming control, the peak current is set using the second drive current profile. Thus, the effect of the present disclosure is large.

In the present embodiment, the peak current is changed according to the injection time of the compression stroke injection or the expansion stroke injection. Specifically, when a difference between the injection time Ta and the peak current arrival time Tb of the fuel injection valve 21 is small, it is determined that the timing when energization is turned off is close to a timing when the drive current arrives at the peak current, and the peak current is increased. In this manner, when the timing when energization is turned off is close to the timing when the drive current arrives at the peak current, irrespective of a variation in the peak current, energization is turned off at all times before the drive current arrives at the peak current (that is, during increase in the drive current), suppressing the variation in the injection amount due to the variation in the peak current.

In the above-mentioned embodiment, when the compression stroke injection or the expansion stroke injection is executed during the execution of the catalyst early-stage warming control, the drive current is set using the second drive current profile. However, the present invention is not limited to the embodiment. Irrespective whether catalyst early-stage warming control is being executed, when the compression stroke injection or the expansion stroke injection is performed, the drive current may be set using the second drive current profile.

In the above embodiment, when the compression stroke injection or the expansion stroke injection is performed, the peak current corresponding to the fuel pressure may be set using a second drive current profile having no hysteresis in change characteristics of the peak current with respect to the fuel pressure. However, the present invention is not limited to the embodiment. When the compression stroke injection or the expansion stroke injection is performed, the pick-up current corresponding to the fuel pressure may be set using a second drive current profile having no hysteresis in change characteristics of the pick-up current with respect to the fuel pressure. Alternatively, when the compression stroke injection or the expansion stroke injection is performed, the hold current corresponding to the fuel pressure may be set using a second drive current profile having a hysteresis in change characteristics of the hold current with respect to the fuel pressure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An injection control device for an internal combustion engine of a cylinder-injection type, the injection control device comprising:
   a fuel injection valve directly injecting a fuel into a cylinder of the internal combustion engine; and
   a drive current setting unit setting a drive current for the fuel injection valve according to a fuel pressure, using a drive current profile specifying a relation between the fuel pressure and the drive current, the fuel pressure being a pressure of the fuel supplied to the fuel injection valve,
   wherein when a compression stroke injection that injects the fuel in a compression stroke or an expansion stroke injection that injects the fuel in an expansion stroke is executed in the internal combustion engine, the drive current setting unit sets the drive current using a predetermined profile having no hysteresis in change characteristics of the drive current with respect to the fuel pressure in a fuel pressure region of the compression stroke injection or the expansion stroke injection, as the drive current profile, and
   the predetermined profile is set to have a hysteresis in the change characteristics of the drive current with respect to the fuel pressure in a fuel pressure region other than the fuel pressure region of the compression stroke injection or the expansion stroke injection.

2. The injection control device for the internal combustion engine of a cylinder-injection type according to claim 1, wherein
   the drive current setting unit sets the drive current using the predetermined profile when the compression stroke injection or the expansion stroke injection is executed during an execution of a catalyst early-stage warming control that early warms up a catalyst purifying an exhaust gas.

3. The injection control device for the internal combustion engine of a cylinder-injection type according to claim 1, wherein
   the predetermined profile is set to change the drive current according to a change of the fuel pressure in a stepped manner.

4. The injection control device for the internal combustion engine of a cylinder-injection type according to claim 1, wherein
   the predetermined profile is set to continuously change the drive current according to a change of the fuel pressure.

5. The injection control device for the internal combustion engine of a cylinder-injection type according to claim 1, wherein
   the drive current setting unit changes a peak value of the drive current according to an injection time of the compression stroke injection or the expansion stroke injection.

* * * * *